(12) United States Patent
Barry et al.

(10) Patent No.: US 9,884,213 B2
(45) Date of Patent: Feb. 6, 2018

(54) THERMAL VALVE IN UPSTREAM OIL AND GAS

(71) Applicant: Emerson Process Management Regulator Technologies Tulsa, LLC, Tulsa, OK (US)

(72) Inventors: Peter F. Barry, Tulsa, OK (US); John D. Cockerham, Tulsa, OK (US); Matthew A. Farris, Owasso, OK (US); Samuel S. Garman, Locust Grove, OK (US)

(73) Assignee: Emerson Process Management Regulator Technologies Tulsa, LLC, Tulsa, OK (US)

( * ) Notice: Subject to any disclaimer, the term of this patent is extended or adjusted under 35 U.S.C. 154(b) by 0 days.

(21) Appl. No.: 15/365,444

(22) Filed: Nov. 30, 2016

(65) Prior Publication Data

US 2017/0151451 A1  Jun. 1, 2017

Related U.S. Application Data

(60) Provisional application No. 62/260,925, filed on Nov. 30, 2015.

(51) Int. Cl.
*F16K 17/38* (2006.01)
*A62C 4/02* (2006.01)
(Continued)

(52) U.S. Cl.
CPC .............. *A62C 4/02* (2013.01); *B65D 90/22* (2013.01); *F16K 17/383* (2013.01);
(Continued)

(58) Field of Classification Search
CPC ....... A62C 4/02; F16K 17/383; F16K 31/002; F23D 14/825; B65D 90/22; F23G 7/085; Y10T 137/1827
(Continued)

(56) References Cited

U.S. PATENT DOCUMENTS 3,862,641 A    1/1975  Follett
4,118,173 A   10/1978  Shakiba
(Continued)

FOREIGN PATENT DOCUMENTS

CH            575104 A5    4/1976

OTHER PUBLICATIONS

International Search Report and Written Opinion for Application No. PCT/US2016/064061 dated Mar. 6, 2017.

*Primary Examiner* — John Bastianelli
(74) *Attorney, Agent, or Firm* — Marshall, Gerstein & Borun LLP (57) ABSTRACT

A storage system includes a storage tank adapted to store a fluid therein, a flame arrestor being positioned downstream from the storage tank, a thermal valve being positioned downstream from the flame arrestor, and a flare stack being positioned downstream from and in fluid communication with the thermal valve. An outlet port of the storage tank is in fluid communication with an inlet port of the flame arrestor, and an outlet port of the flame arrestor is in fluid communication with an inlet port of the thermal valve. A flow path is formed between the storage tank and the flare stack via the flame arrestor and the thermal valve. The thermal valve has a cross-sectional area along a direction of the flow path which is substantially vacant of physical detonation-inducing obstructions.

15 Claims, 4 Drawing Sheets

(51) Int. Cl.
*B65D 90/22* (2006.01)
*F16K 31/00* (2006.01)
*F23G 7/08* (2006.01)
*F23D 14/82* (2006.01)

(52) U.S. Cl.
CPC .......... *F16K 31/002* (2013.01); *F23D 14/825* (2013.01); *F23G 7/085* (2013.01); *Y10T 137/1827* (2015.04)

(58) Field of Classification Search
USPC .......................... 137/76, 74, 72; 431/18, 202
See application file for complete search history.

(56) References Cited

U.S. PATENT DOCUMENTS

| | | | |
|---|---|---|---|
| 4,137,036 A * | 1/1979 | Straitz, III | F23G 7/085 431/202 |
| 4,468,193 A * | 8/1984 | Lawrence | F23G 7/08 137/118.05 |
| 5,415,233 A | 5/1995 | Roussakis et al. | |
| 5,873,712 A * | 2/1999 | Guerra | F23G 7/085 431/202 |
| 6,485,292 B1 | 11/2002 | Rhodes et al. | |
| 2007/0281266 A1* | 12/2007 | Rajewski | F23G 7/08 431/202 |
| 2009/0263755 A1* | 10/2009 | Nigro | F23D 14/68 431/202 |
| 2014/0370448 A1* | 12/2014 | Aldrich | F23G 7/085 431/202 |

\* cited by examiner

THERMAL VALVE IN UPSTREAM OIL AND GAS

CROSS REFERENCE TO RELATED APPLICATIONS

This application claims the benefit of U.S. Provisional Application No. 62/260,925 (filed on Nov. 30, 2015). The entirety of the foregoing provisional application is incorporated by reference herein.

FIELD OF THE DISCLOSURE

The present disclosure generally relates to control equipment in oil and gas environments and, more particularly, to thermal valves which minimize turbulent flow of fluids travelling therein.

BACKGROUND

In upstream oil and gas supply applications, oil is stored in a variety of storage tanks. During the transport of the oil from the tank to the upstream application, flammable gasses may be generated which are burned off by gas flares or flare stacks. At times, the velocity of vapors flowing towards the flare may be low enough to allow the flame from the flare to travel into the pipe in the opposite direction. Potentially catastrophic failures may occur if the flame is allowed to reach the storage tank.

Additionally, damaging detonations may occur in which the flame rapidly propagates the flow path in a manner resembling a shockwave. These detonations are oftentimes caused by turbulence-creating geometries such as bends, sharp turns, and other interruptions to the flow path.

To mitigate this risk, flame or deflagration arrestors may be implemented and disposed between the storage tank and the gas flare. In the event that a flame propagates towards the storage tank, these flame arrestors block the flame from further advancing to the storage tank. However, these flame arrestors have a limited useful life and their performance can be compromised upon being exposed to flames for extended periods of time. Further, these flame arrestors may not be suitable to contain or limit flames caused by detonations due to their rapid propagation. Further still, when employed in remote locations, these flame arrestors may be difficult to inspect, thus any degradation in quality may not be realized. In other examples, early detection equipment such as temperature detection sensors and the like are also frequently used in these environments. However, this equipment may experience similar pitfalls due to being positioned in remote locations.

SUMMARY

Generally speaking, pursuant to these various embodiments, systems and approaches for a thermal valve in upstream oil and gas applications are provided and may include a storage tank adapted to store a fluid therein, a flame arrestor being positioned downstream from the storage tank, a thermal valve being positioned downstream from the flame arrestor, and a flare stack being positioned downstream from and in fluid communication with the thermal valve. An outlet port of the storage tank is in fluid communication with an inlet port of the flame arrestor to allow the fluid to flow between the storage tank and through the flame arrestor, and an outlet port of the flame arrestor is in fluid communication with an inlet port of the thermal valve to allow the fluid to flow between the flame arrestor and through the thermal valve. In some approaches, the thermal valve comprises a valve assembly which is removably disposed within a valve body of the thermal valve. The flame arrestor is adapted to restrict propagation of the fluid when the fluid propagates the fluid flow path in the direction from the flare stack towards the storage tank. The flare stack is adapted to vent a byproduct flare gas from the storage tank. A flow path is formed between the storage tank and the flare stack via the flame arrestor and the thermal valve. The thermal valve has a cross-sectional area along a direction of the flow path which is substantially vacant of physical detonation-inducing obstructions.

In some embodiments, the thermal valve is constructed to accommodate an operating pressure of approximately 5 to 50,000 psi. The thermal valve may define a channel extending between the inlet port and the outlet port thereof which allows the flow path to traverse the thermal valve. The channel is constructed to maintain a substantially steady fluid flow pressure when the fluid traverses the channel. In some examples, the flow path is entirely free of physical detonation-inducing obstructions.

In some embodiments, a portion of the thermal valve is movable between a first loaded position and a second activated position upon being contacted by the fluid while propagating the fluid flow path in a direction from the flare stack towards the storage tank. The thermal valve is adapted to move to the closed position upon the fluid propagating the fluid flow path at a temperature of approximately 100-1000 degrees Fahrenheit. It is understood that other examples known by those having skill in the art are possible.

In other embodiments, an oil and gas system is provided which includes a storage tank which stores a fluid, a flame arrestor in fluid communication with an outlet of the storage tank, a thermal valve in fluid communication with an outlet of the flame arrestor, a flare stack in fluid communication with an outlet of the thermal valve, and a fluid flow path. The fluid flow path extends between the storage tank and the flare stack and allows a fluid to flow from the storage tank to the flare stack in a first direction and a second direction opposite the first direction. The thermal valve restricts the fluid from traversing the fluid flow path when the fluid, while propagating the fluid flow path in the second direction, contacts at least a portion of the thermal valve, thereby substantially restricting the fluid from propagating to the storage tank. In some forms, the fluid flow path is entirely vacant of physical obstructions.

The thermal valve may be configured to operate at a pressure of approximately 5 to 50,000 psi. The thermal valve may define a channel allowing the fluid flow path to traverse a length thereof. The channel may comprise a generally structure that maintains a substantially steady fluid flow pressure when the fluid traverses the channel.

In some approaches, the thermal valve may comprise a valve body forming a channel at least partially defining the fluid flow path extending from an inlet port of the valve body to an outlet port of the valve body via a gallery of the valve body which is disposed between the inlet port and the outlet port. The valve body may further define an opening disposed in communication with the gallery. In these approaches, the inlet port of the thermal valve is in fluid communication with an outlet port of the flame arrestor, and the outlet port of the thermal valve is in fluid communication with the flare stack. The thermal valve may further comprise a valve assembly adapted to be at least partially disposed through the opening and in the gallery of the valve body and a fusible element being adapted to be coupled to and at least partly supported by the valve assembly. The valve disc of the valve assembly moves between a first position spaced from a valve seat of the valve body and a second position in contact with the valve seat. The fusible element maintains the valve assembly in the first position. The fusible element is further adapted to fail when contacted by a fluid traversing the fluid flow path in the second direction to allow the valve disc of the valve assembly to move to the second position.

So configured, the thermal valve may be utilized in low-pressure applications in which flammable fluids may be stored and used. The thermal valve may act to shut off fluid flow in the event deflagration occurs, and when used in cooperation with the flame arrestor, fluids (e.g., flames) will not propagate to the storage tank. Further, because the fluid flow path is free of physical obstructions, the potentially volatile nature of the fluids is not experienced, thus the likelihood of a deflagration and/or detonation event is minimized.

BRIEF DESCRIPTION OF THE DRAWINGS

The above needs are at least partially met through provision of the thermal valve in upstream oil and gas applications described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Figure 1:
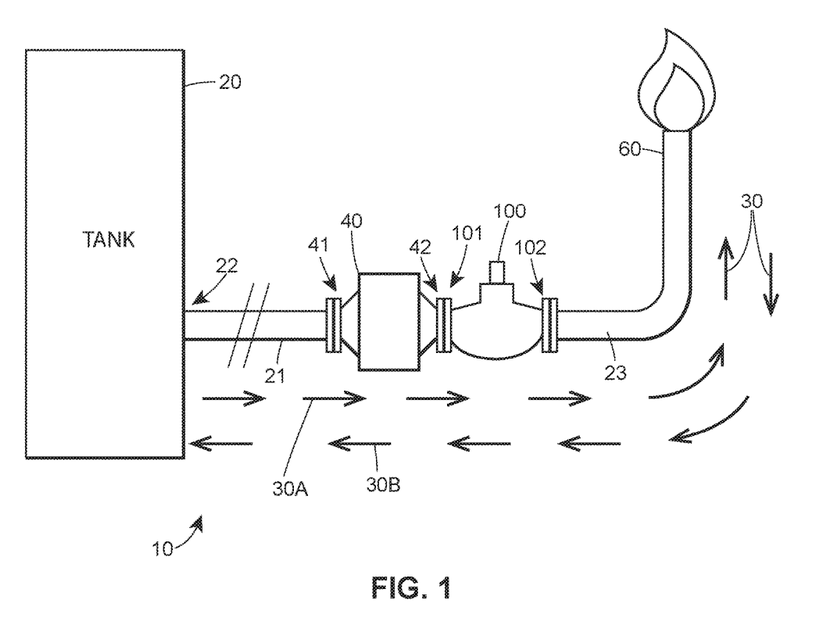
FIG. 1 comprises a schematic view of an exemplary oil and gas system in accordance with various embodiments of the invention having a thermal valve.

Referring now to the drawings, and in particular to FIG. 1, a storage system 10 is provided which includes a storage tank 20, a flame arrestor 40, a flare stack 60, and a thermal valve 100. A first conduit 21 extends between the tank 20 and the arrestor 40. A second conduit 23 extends between the thermal valve 100 and the flare stack 60. In the depicted version, the arrestor 40 and the thermal valve 100 are connected directly together, but in other versions, they can be connected by a conduit. The storage tank 20 may include an inlet (not shown) and an outlet 22. A flow path 30 is formed between the storage tank 20 and the flare stack 60 via the first conduit 21, the flame arrestor 40, the thermal valve 100, and the second conduit 23. The flow path 30 allows the fluid to propagate in a first direction 30A extending from the storage tank 20 to the flare stack 60 and in a second, opposite direction 30B extending from the flare stack 60 to the storage tank 20. Generally speaking, when a fluid propagates the flow path 30 in the second direction 30B, a deflagration has occurred in which the fluid combusts and propagates towards the storage tank 20. It is understood that any number of additional components (e.g., refining, testing, and/or processing stations and the like) may be disposed at any number of locations along the flow path 30. These additional components will not be discussed in further detail.

It is understood that by the term "fluid" and as described herein, it is meant any suitable liquids and/or gases which may be stored and utilized in oil and gas applications. For example, suitable fluids may include Group D gases such as methane, propane, and/or natural gas. Other examples are possible. These fluids may generate flames or deflagration events upon experiencing a substantial amount of turbulent flow. Other examples are possible.

The flame arrestor 40 includes an inlet port 41 and an outlet port 42 and is positioned downstream from the storage tank 20 such that the outlet 22 of the storage tank 20 is coupled to the inlet port 41 of the flame arrestor 40 via the first conduit 21 to allow the fluid to flow between the storage tank 20 and through the flame arrestor 40. In other words, the flame arrestor 40 is in fluid communication with the outlet 22 of the storage tank 20. While only the first conduit 21 is described and depicted, it is understood that any number of devices or structures may be used to form portions of the flow path 30 to connect the storage tank 20 to the flame arrestor 40 such as tubular pipes, fittings, flanges, connectors, and the like. Other examples are possible.

The flame arrestor 40 may include any number of components forming a metal matrix which creates a flame element. This metal matrix serves the purpose of extracting heat from the flame as it propagates the flame arrestor body. In some examples, layers of metallic ribbons having crimped corrugations form the metal matrix. The metal matrix allows a fluid to flow therethrough from the inlet port 41 to the outlet port 42, but prevents or restricts a flame or fluid from propagating the flame arrestor 42. The passages of the metal matrix are dimensioned according to maximum experimental safe gaps (MESG) values for the particular fluid or fluids being used. The flame arrestor 40 may include any number of additional components understood in the art.

The thermal valve 100 includes an inlet port 101 and an outlet port 102 and is positioned downstream from the flame arrestor 40 such that the outlet port 42 of the flame arrestor 40 is coupled to the inlet port 101 of the thermal valve 100 to allow the fluid to flow therebetween. In other words, the thermal valve 100 is in fluid communication with the outlet 42 of the flame arrestor 40. While the inlet port 101 of the thermal valve 100 is depicted as being connected directly to the outlet port 42 of the flame arrestor 40, any number of devices or structures may be used to form portions of the flow path 30 to connect the flame arrestor 40 to the thermal valve 100 including conduits, connectors, flanges, other valves, filters, and the like. Some specific examples of the thermal valve 100 are described below with reference to FIGS. 2A, 2B, and 3.

The thermal valve 100 has a cross-sectional area along the flow path 30 which is substantially vacant of physical detonation-inducing obstructions. For example, the thermal valve may form a channel between the inlet port 101 and the outlet port 102 which is generally circular in cross-section and may be free of projections or sharp changes of direction which may disturb the flow of fluid. The thermal valve may be constructed such that it accommodates an operating pressure of approximately 5 to 50,000 psi, and may be suitable for use with Group D gasses. It is understood that other examples known by those having skill in the art are possible. In other words, the channel formed within the thermal valve 100 may allow the fluid to traverse the thermal valve while maintaining a substantially steady fluid flow pressure which in turn reduces the potential occurrence of detonation events.

In some examples, the thermal valve 100 restricts the fluid and/or flame from traversing the fluid flow path 30 when the fluid, while propagating the fluid flow path 30 in the second direction 30B, contacts at least a portion of the thermal valve 100. As a result, the thermal valve 100 substantially restricts the fluid and/or flame from propagating from the flare stack to the storage tank 20. As will be described in detail, a portion of the thermal valve 100 is movable between a first loaded position and a second activated position upon being contacted by the fluid and/or flame while it propagates the flow path 30 in the second direction 30B. The thermal valve may be adapted to move to the closed position upon the fluid propagating the flow path 30B at a temperature of at least approximately 100 degrees Fahrenheit. Any fluid and/or flame that manages to advance beyond the thermal valve 100 will then be extinguished by the flame arrestor 40.

The flare stack 60 is positioned downstream from and in fluid communication with the outlet port 102 of the thermal valve 100. While the second conduit 23 is depicted, any number of devices or structures may be used to form portions of the flow path 30 to connect the thermal valve 100 to the flare stack 60. The flare stack 60 is a combustion device used to burn off flammable gases released by relief valves. It is understood that any number of different configurations of flare stacks 60 may be used in conjunction with the storage system 10 and are known by those having skill in the art, thus further details of particular components of the flare stack 60 will not be described.

Accordingly, fluids (e.g., Group D liquids) stored in the storage tank 20 may flow in the first fluid flow direction 30A through the first conduit 21, the flame arrestor 40, the thermal valve 100, and the second conduit to be used by desired upstream applications. The flame arrestor 40 and the thermal valve 100 allow the fluid to pass therethrough without restriction when the fluid is propagating in the first flow direction 30A. Excess gases escape to the atmosphere via the flare stack 60. If a deflagration event occurs, a flame may propagate in the second fluid flow direction 30B towards the storage tank 20. Upon reaching the thermal valve 100, the valve close, thus restricting the flame from advancing further towards the storage tank 20. In the event that the flame does manage to advance past the thermal valve 100, the flame arrestor 40 will act to remove the heat from the flame until it eventually burns out. Because the thermal valve is closed, additional fluid flowing in the second fluid flow direction 30B will not act to sustain the flame. As a result, the use of a multi-component safety measure will reduce the likelihood of potentially catastrophic events in which the flame reaches the storage tank 20. Further, because the entirety of the fluid flow path 30 is free of physical obstructions, the risk of detonations occurring due to turbulent fluid flow is also reduced.

In one exemplary embodiment, the thermal valve 100 is described with reference to FIGS. 2A and 2B. The valve 100 includes a valve body 108, a valve assembly 110, and a fusible element 130 or pin. The valve body 108 forms a bonnet opening 103 and further forms a channel 104 which defines a fluid flow path extending from an inlet port 101 of the valve body 108 to an outlet port 102 of the valve body 108 via a gallery 105. The fluid may flow along the channel 104 in a first direction 106 (e.g., from the inlet port 101 to the outlet port 102) or a second direction 107 (e.g., from the outlet port 102 to the inlet port 101). The valve 100 also forms a valve seat 114 located in the gallery 105.

As previously described, the valve 100 is adapted to be disposed between the storage tank 20 and the flame arrestor 60 of FIG. 1 and any other upstream components (not shown) for use and/or processing. The valve body 108 may be constructed of any number of metallic materials and is formed using any number of methods, such as, for example, extruding, forging, and the like. Other examples are possible. It is understood that the valve 100 may include any number of additional components not described herein for the sake of brevity.

The valve assembly 110 may include a valve bonnet 112 adapted to at least partially cover the bonnet opening 103 of the valve body 108, a valve stem 116, a valve disc 118, and a valve spring 120. The individual components of the valve assembly 110 may be constructed of any number of suitable materials, such as, for example, metals, metal alloys, polymers, and the like. Other examples are possible.

In some examples, the valve bonnet 112 is a generally planar component which may serve as a partial or complete seal to the bonnet opening 103. The valve bonnet 112 may be coupled to the valve body 108 using any number of components such as, for example, nuts, bolts, screws, clamps, and the like. Other examples are possible.

The valve stem 116 may be coupled to the valve bonnet 112 using any number of suitable components and techniques. The valve stem 116 may have a central longitudinal axis L1 and may include an opening 117 or openings extending along a lateral axis L2 which is transverse to the longitudinal axis L1. In the disclosed versions, the lateral axis L2 is approximately perpendicular to the central longitudinal axis L1 of the valve stem 116. The valve stem 116 is adapted to move between a first position (FIG. 2A) and a second position (FIG. 2B) via any number of components. The first position may be described as a "loaded" position and the second position may be described as an "activated" position. For example, the valve stem 116 may comprise a telescopic tube element 116A including a first telescoping component 116B (also referred to as an "inner tube") slidably disposed within a second telescoping component 116C (also referred to as an "outer tube"). In the disclosed embodiment, the outer tube 116C is fixed to the valve bonnet 112 and the inner tube 116B is axially displaceable relative to the outer tube 116C, as will be described. In other versions, the inner tube 116B can be fixed to the valve bonnet 112 and the outer tube 116C could be slidably displaceable relative to the inner tube 116B and the valve bonnet 112. In still other versions, the valve stem 116 may include more than two telescoping components (also referred to as "tubes") while achieving the same desired purpose.

In this example, the inner tube 116B and the outer tube 116C have a common central longitudinal axis L1. The inner tube 116B is dimensioned such that it may be inserted into the outer tube 116C. Further, both the inner tube 116B and the outer tube 116C may have aligned openings 117 along their lateral axes L2 when the valve stem 116 is in the first, loaded position. Other examples are possible.

The valve seat 114 is at least partially formed by the valve body 108 and is disposed between the inlet port 101 and the outlet port 102 of the valve body 108. In some examples, the valve seat 114 may be a ledge or platform having a cross sectional shape identical or similar to that of the channel 104. It is understood that the valve seat 114 may be an integral component of the valve body 108 or may include separate components such as a seat ring attached to the valve body 108 using any number of methods such as threads, screws, and the like. Other examples are possible.

The valve disc 118 is adapted to be coupled to the valve stem 116 and, in particular, a distal end of the inner tube 116B of the disclosed valve stem 112. The valve spring 120 is adapted to be at least partially disposed between the valve bonnet 112 and the valve disc 118 and is adapted to exert a force (denoted by "F" in the drawings) on at least one of the valve stem 116, the fusible element 130, and the valve disc 118. In the disclosed version, the valve spring 120 exerts a downward force on the valve disc 118 and inner tube 116B of the valve stem 112, which in turn applies a shear load to the fusible element 130 as will be described.

The fusible element 130 or link may be any type of device capable of being fused or melted at a desired temperature or range of temperatures. The fusible element 130 may be constructed of any number of materials (e.g., tin/bismuth alloys, tin/zinc/lead, and bismuth, to name a few) and may be chosen based on the material's physical properties such as melting point, shear strength, bending resistance, etc. One example of a suitable melting temperature is between approximately 100° F. and 1000° F., though it is understood that other examples, such as between approximately 115° F. and 80050° F. are possible. The fusible element 130 may be generally cylindrically shaped and thus have a generally circular cross sectional area. It is understood that any cross sectional shape may be used as desired. The fusible element 130 may be inserted into the opening or openings 117 of the valve stem 116 to act as a lock or stop which restricts the inner tube 116B of the valve stem 116 from moving along the lateral axis L1 relative to the outer tube 116C.

Figure 2A:
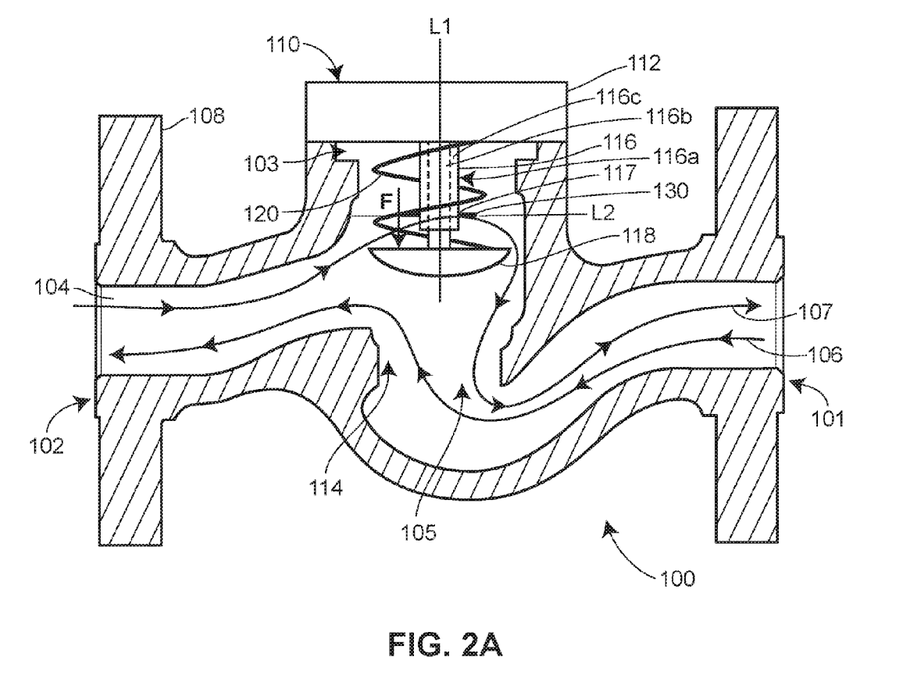
FIG. 2A comprises a schematic front cross-sectional view of an exemplary pin-release thermal valve in accordance with various embodiments of the invention.

In operation, and as illustrated in FIG. 2A, valve stem 116 and valve disc 118 are moved to the first position, which causes the valve spring 120 to compress. The fusible element 130 is inserted into the opening 117 of the valve stem 116 and therefore resides along the lateral axis L2 which in the disclosed example is generally perpendicular to the longitudinal axis L1 of the valve stem 116 to restrict movement of the inner tube 116B and valve disc 118 relative to the outer tube 116C. Because the valve spring 120 is in a compressed state, an upper peripheral edge portion of the openings 117 in the inner tube 116B of the valve stem 116 will exert a downward force F on the portion of the fusible element 130 residing within the openings 117 in the inner tube 116B, and a lower peripheral edge portion of the openings 117 in the outer tube 116C of the valve stem 116 will exert an equal and opposite reactionary force on the adjacent portion of the fusible element 130 residing within the openings 117 in the outer tube 116C. These combined forces will in turn maintain the fusible element 130 within the opening 117 as well as the valve assembly 110 in the first or "loaded" position. Accordingly, the valve assembly 110 is maintained in this loaded position without the valve stem 116, fusible element 130, or valve spring 120 interacting with, contacting, or bearing against portions of the valve body 108 for support. A shear force is exerted on at least a portion of the fusible element 130 when the valve stem 116 is in this first position. The valve bonnet 112, the valve stem 116, the valve disc 118, and the valve spring 120 may then be inserted into the bonnet opening 103 of the valve body 108 and coupled thereto via the valve bonnet 112.

When the valve assembly 110 is in the first position, fluid may move freely along the first fluid flow path 106. This is because the valve assembly 110 is spaced away from the valve seat 114 and substantially out of the fluid flow path 106. Said another way, a substantial part of the fluid flow path through the gallery 105 of the valve body 108 where the valve assembly 110 is in the first position is entirely free of physical obstructions. The first direction 106 of the fluid flow path may be used to transport fluids from the storage tank to upstream components for use and/or processing. When a fluid moves along the fluid flow path in the first direction 106, the fusible element 130 remains substantially out of contact with the fluid. In some embodiments, a substantial portion of the components in the valve assembly 110 also remain out of contact with the fluid during movement along the first direction 106. As such, the fluid flow is smooth and generally free of interruptions and/or bends which may create turbulent flow. It is understood that in some embodiments, the fluid moving along the first fluid flow path 106 may contact any or all of the fusible element 130 and any number of components in the valve assembly 110, but the fluid travel may still remain generally free of turbulence.

Figure 2B:
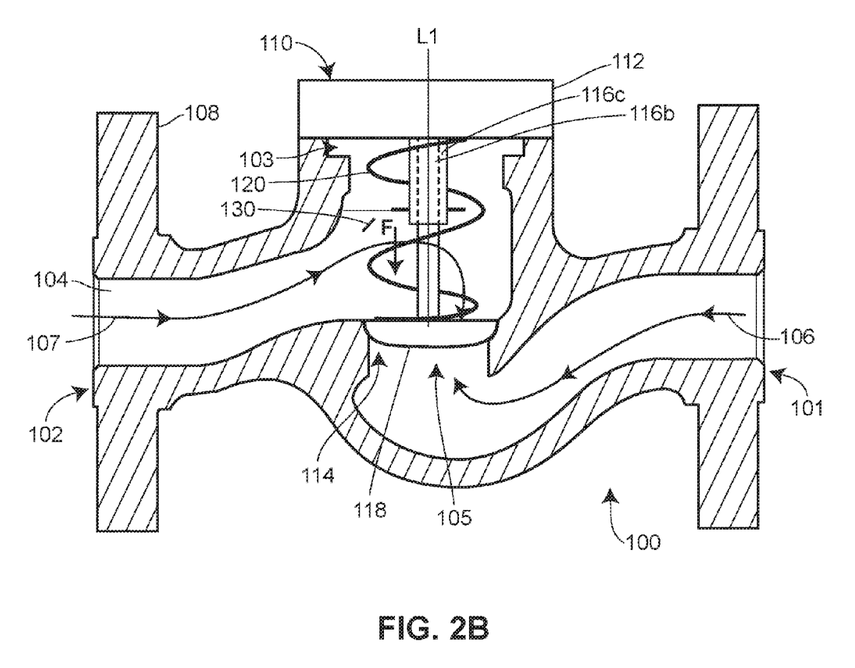
FIG. 2B comprises a schematic front cross-sectional view of the exemplary pin-release thermal valve of FIG. 2A in an activated position in accordance with various embodiments of the invention.

Turning to FIG. 2B, in the event of a deflagration event in which a flame and its corresponding fluids travel back towards the storage tank 20 and into the valve 100 in the second direction 107 of the fluid flow path, the fluid may contact the fusible element 130. Because the fusible element 130 is selected having desired melting parameters (e.g., between approximately 115 and approximately 800 degrees Fahrenheit), the propagation of the fluid along the second fluid flow path 107 will cause the fusible element 130 to melt. As such, the force exerted by the spring 120 will eventually overcome the resistive force of the fusible element 130 and move the valve assembly 110 from the first position to the second position. When a portion of the valve assembly 110 moves to the second, activated position, the inner tube 116B moves axially relative to the outer tube 116C such that the valve disc 118 contacts the valve seat 114 and create a seal which restricts fluids from propagating beyond the valve seat 114 in the second direction 107. In the disclosed version, the inner tube 116B slides partly out of the outer tube 116C as the valve stem 116 moves from the first position to the second position. As a result, while an amount of fluid and/or flame may have propagated beyond the valve stem 114 before the valve assembly 110 moved to the second position, the flame will eventually burn out due to a lack of fluid supplied thereto. Further, in some examples, when the valve assembly 110 is in the second position, movement along the fluid flow path in the first direction 106 may also be restricted.

Furthermore, because the first direction 106 and the second direction 107 contain a minimal number of changes in overall direction, interruptions, edges, and/or other flow-disturbing components, the chances of generating turbulent flow are minimized. As a result, even in the event of a deflagration event in which a fluid is propagating in the second direction 107, the likelihood of creating a potentially catastrophic detonation event is substantially reduced. Further, despite portions of the valve assembly 110 being disposed at a position which may be contacted by a fluid propagating in the second direction 107, the occurrence detonation events remains unlikely.

Because the valve assembly 110 may be readily coupled together, it is possible to easily replace damaged components. For example, in the event that a deflagration event occurs in which a fluid propagates in the second direction 107, while the fusible element 130 may have melted away, the valve assembly may be reused by removing the valve bonnet 112, the valve stem 116, the valve disc 118, and the valve spring 120 by decoupling the valve bonnet 112 from the valve body 108. The valve stem 116 may then be reset in the first "loaded" position, and a new fusible element 130 may be inserted into the opening 117. The valve assembly 110 may then be reinserted into the bonnet opening 103 of the valve body 108.

Figure 3:
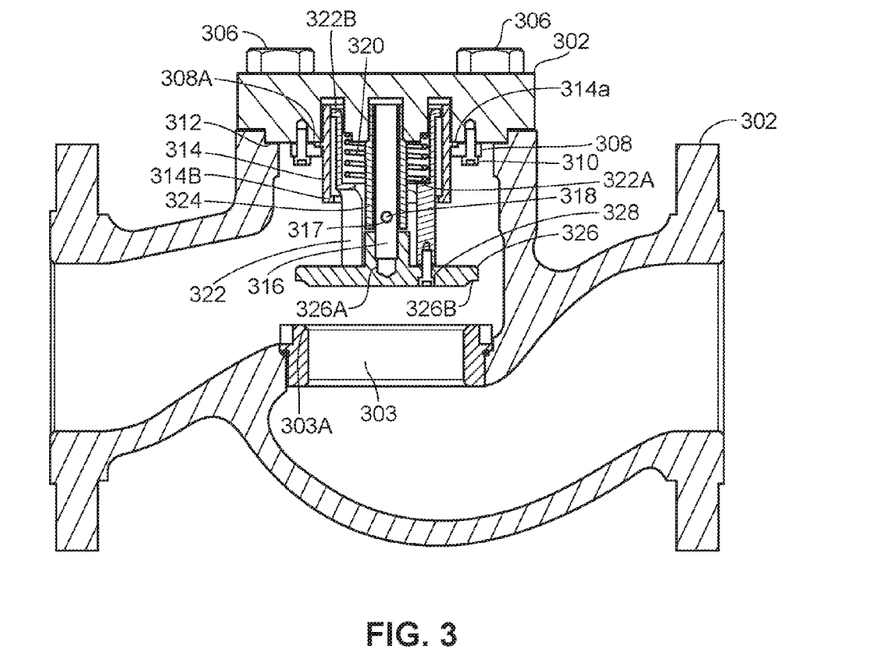
FIG. 3 comprises a schematic front elevation cross-sectional view of an exemplary version of a pin-release thermal valve in accordance with various embodiments of the invention.

Turning to FIG. 3, a detailed schematic of an alternative valve 300 is provided. The valve 300 includes a valve body 302, an orifice 303, a bonnet 304, bonnet bolts 306, an outer guide clamp 308, outer guide clamp screws 310, a gasket 312, an outer guide 314, a stem 316, a stem opening 317, a fusible pin 318, a spring 320, a spring support 322, a stem guide 324, a disc or pallet 326, and pallet screws 328.

The valve body 302 and the bonnet 304 may be made of any number of suitable metals such as stainless steel (e.g., 316 stainless steel). The gasket 312 may be constructed of graphite, rubbers, or any other suitable materials and may be flame-resistant. The gasket 312 is disposed in an opening of the valve body 302 to create a seal to prevent leakage of pipe line fluid to the atmosphere. The bonnet 304 is coupled to the valve 302 via any number of bonnet bolts 306, which may be constructed of metals such as stainless steel (e.g., a combination 304/316 stainless steel yield material). Other examples are possible. The bonnet 304 is responsible for securing the remainder of the valve assembly to the valve 302.

The outer guide 314 may be a cylindrical tube-like structure adapted to couple to the bonnet and is adapted to prevent the spring support 322 from extending past a certain point and will be described in further detail below. The outer guide 314 may be made of any number of suitable metals such as stainless steel (e.g., 316 stainless steel). The outer guide 314 may be coupled to the bonnet 304 via the outer guide clamp 308 using the outer guide clamp screws 310. It is understood that any number of outer guide clamp screws 310 may be used to couple the outer guide 314 to the bonnet 304. The outer guide 314 may include a first notch or protrusion 314A which is adapted to contact a ledge 308A of the outer guide clamp. The outer guide clamp 308 and outer guide clamp screws 310 may be made of any number of suitable metals such as stainless steel (e.g., 316 stainless steel). Other examples are possible.

The spring 320 may be constructed of any suitable material such as a metal and/or metallic alloy (e.g., an austenite nickel-chromium-based superalloy). Other examples are possible. The spring 320 is positioned against the bonnet 304 on a first end and is supported by a ledge 322A of the spring support 322 on a second end thereof. The spring support 322 may be made of any number of suitable metals such as stainless steel (e.g., 316 stainless steel). Other examples are possible.

Disposed inside a central portion of the spring 320 is a stem guide 324. The stem guide 324 may be made of any number of suitable metals such as stainless steel (e.g., 316 stainless steel) and may be coupled to the bonnet 304 via a threaded connection or other suitable methods. The stem guide 324 is adapted to guide the stem 316 disposed therein as the pallet 326 moves between a first and a second position.

The stem 316 and the pallet 326 may be constructed of any number of suitable materials such as stainless steel (e.g., 410 stainless steel or other suitable materials). The stem bay may be coupled to the pallet 326 via any number of connections, such as a threaded connection, a press-fit connection via a central bore 326A in the pallet, or any other suitable method. The pallet 326 may be coupled to the spring support 322 via pallet screws 328 to ensure forces exerted by the spring 320 are evenly distributed on the pallet 326. As such, the pallet 326 may include a counter bore to create a planar surface.

The fusible pin 318 may be an elongated component constructed of any suitable material or materials such as a bismuth/tin mixture which may be modified to provide different melting temperatures. It is understood that the fusible pin 318 may be any suitable shape such as cylindrical or cuboidal. Other examples are possible. The fusible pin is adapted to be inserted into an opening 317 of the stem 316 and an opening of the stem guide 324. By inserting the fusible pin 318 into these openings, the assembly is locked in a first position whereby the spring 320 causes a shear force to be exerted on the fusible pin 318.

Upon the fusible pin 318 melting due to a deflagration event, the spring 320 causes the stem 316 and pallet 326 to move towards the orifice 303. This lateral movement is guided by the stem guide 324, spring support 322, and the outer guide 314 to ensure proper alignment of the pallet 326. The orifice 303 includes a parabolic surface 303A which is adapted to contact a corresponding parabolic surface 326B on the pallet 326 to ensure the pallet 326 maintains contact with the edge of the orifice 303 to seal and stop flow from traveling through the valve.

When it is desired to remove the valve assembly from the valve 302, the bonnet bolts 306 may be unbolted and the bonnet 304 and the assembly may be removed from the opening. During removal, a second notch 314B of the outer guide 314 contacts a corresponding notch 322B or lip of the spring support 322 to capture the entire assembly for removal.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A storage system comprising:
    a storage tank adapted to store a fluid therein, the storage tank including an inlet and an outlet;
    a flame arrestor having an inlet port and an outlet port, the flame arrestor being positioned downstream from the storage tank such that the outlet of the storage tank is coupled to the inlet port of the flame arrestor to allow the fluid to flow between the storage tank and through the flame arrestor;
    a thermal valve having an inlet port and an outlet port and being positioned downstream from the flame arrestor such that the outlet port of the flame arrestor is coupled to the inlet port of the thermal valve to allow the fluid to flow between the flame arrestor and through the thermal valve; and
    a flare stack being positioned downstream from and in fluid communication with the outlet port of the thermal valve, the flare stack being adapted to vent a byproduct flare gas from the storage tank;

wherein a flow path is formed between the storage tank and the flare stack via the flame arrestor and the thermal valve; and wherein the thermal valve comprises:

a valve body forming a channel at least partially defining the fluid flow path extending from an inlet port of the valve body to an outlet port of the valve body via a gallery of the valve body that is disposed between the inlet port and the outlet port, the valve body further defining an opening disposed in communication with the gallery, wherein the inlet port of the thermal valve is in fluid communication with an outlet port of the flame arrestor and the outlet port of the thermal valve is in fluid communication with the flare stack;

a valve assembly adapted to be at least partially disposed through the opening and in the gallery of the valve body, wherein a valve disc of the valve assembly moves between a first position spaced from a valve seat of the valve body and a second position in contact with the valve seat; and a fusible element being adapted to be coupled to and at least partly supported by the valve assembly to maintain the valve assembly in the first position;

wherein the fusible element is adapted to fail when contacted by a fluid traversing the fluid flow path in the second direction to allow the valve disc of the valve assembly to move to the second position.

2. The storage system of claim 1, wherein the thermal valve is constructed to accommodate an operating pressure of approximately 5 to 50,000 PSI.

3. The storage system of claim 1, wherein the thermal valve defines a channel extending between the inlet port and the outlet port of the thermal valve, the channel allowing the flow path to traverse the thermal valve, wherein the channel is constructed to maintain a substantially steady fluid flow pressure when the fluid traverses the channel.

4. The storage system of claim 1, wherein the flow path is entirely free of physical detonation-inducing obstructions.

5. The storage system of claim 1, wherein a portion of the thermal valve is movable between a first loaded position and a second activated position upon being contacted by the fluid while propagating the fluid flow path in a direction from the flare stack towards the storage tank.

6. The storage system of claim 1, wherein the thermal valve is adapted to move to the activated position upon the fluid propagating the fluid flow path at a temperature between approximately 100 and 1000 degrees Fahrenheit.

7. The storage system of claim 1, wherein the thermal valve comprises a valve assembly that is removably disposed within a valve body of the thermal valve.

8. The storage system of claim 1, wherein the flame arrestor is adapted to restrict propagation of the fluid when the fluid propagates the fluid flow path in the direction from the flare stack towards the storage tank.

9. An oil and gas system comprising:

a storage tank adapted to store a fluid therein, the storage tank including an inlet and an outlet;

a flame arrestor in fluid communication with the outlet of the storage tank;

a thermal valve in fluid communication with an outlet of the flame arrestor;

a flare stack in fluid communication with an outlet of the thermal valve; and a fluid flow path extending between the storage tank and the flare stack, the fluid flow path allowing a fluid to flow from the storage tank to the flare stack in a first direction and a second direction opposite the first direction;

wherein the thermal valve restricts the fluid from traversing the fluid flow path when the fluid, while propagating the fluid flow path in the second direction, contacts at least a portion of the thermal valve thereby substantially restricting the fluid from propagating to the storage tank; and wherein the thermal valve comprises:

a valve body forming a channel at least partially defining the fluid flow path extending from an inlet port of the valve body to an outlet port of the valve body via a gallery of the valve body that is disposed between the inlet port and the outlet port, the valve body further defining an opening disposed in communication with the gallery, wherein the inlet port of the thermal valve is in fluid communication with an outlet port of the flame arrestor and the outlet port of the thermal valve is in fluid communication with the flare stack;

a valve assembly adapted to be at least partially disposed through the opening and in the gallery of the valve body, wherein a valve disc of the valve assembly moves between a first position spaced from a valve seat of the valve body and a second position in contact with the valve seat; and a fusible element being adapted to be coupled to and at least partly supported by the valve assembly to maintain the valve assembly in the first position;

wherein the fusible element is adapted to fail when contacted by a fluid traversing the fluid flow path in the second direction to allow the valve disc of the valve assembly to move to the second position.

10. The oil and gas system of claim 9, wherein the fluid flow path is entirely free of physical detonation-inducing obstructions.

11. The oil and gas system of claim 9, wherein the thermal valve is configured to operate at a pressure of approximately 5 to 50,000 psi.

12. The oil and gas system of claim 9, wherein the thermal valve defines a channel allowing the fluid flow path to traverse a length thereof, wherein the channel comprises a generally tubular structure that maintains a substantially steady fluid flow pressure when the fluid traverses the channel.

13. The oil and gas system of claim 9, wherein the fusible element is adapted to melt upon being contacted by the fluid traversing the fluid flow path in the second direction.

14. The oil and gas system of claim 9, wherein the thermal valve is configured to restrict the fluid from traversing the fluid flow path when the fluid has a temperature between approximately 100 and 1000 degrees Fahrenheit.

15. The oil and gas system of claim 9, wherein the flame arrestor comprises a plurality of channels to absorb heat from the fluid propagating the fluid flow path in the second direction.

* * * * *